(12) United States Patent
Kramer et al.

(10) Patent No.: US 7,906,055 B2
(45) Date of Patent: Mar. 15, 2011

(54) MOLDING ARTICLE WITH REINFORCED PASSAGES

(75) Inventors: Michael Kramer, Huntington Beach, CA (US); Kent Sherwood, Agoura, CA (US)

(73) Assignee: Foam Matrix, Inc., Inglewood, CA (US)

( * ) Notice: Subject to any disclaimer, the term of this patent is extended or adjusted under 35 U.S.C. 154(b) by 0 days.

(21) Appl. No.: 12/618,595

(22) Filed: Nov. 13, 2009

(65) Prior Publication Data

US 2010/0055410 A1    Mar. 4, 2010

Related U.S. Application Data

(63) Continuation-in-part of application No. 11/497,200, filed on Aug. 1, 2006.

(60) Provisional application No. 61/114,448, filed on Nov. 13, 2008.

(51) Int. Cl.
  *B29C 70/44* (2006.01)
  *B29C 45/14* (2006.01)
  *B29C 33/76* (2006.01)
  *B28B 11/08* (2006.01)
  *B60R 21/16* (2006.01)
  *B32B 3/20* (2006.01)

(52) U.S. Cl. ......... 264/258; 264/257; 264/293; 264/317; 428/36.1; 428/188

(58) Field of Classification Search .................. 264/258, 264/317, 263, 293, 257; 428/188, 36.1
See application file for complete search history.

(56) References Cited

U.S. PATENT DOCUMENTS

| | | | | |
|---|---|---|---|---|
| 3,325,861 A | * | 6/1967 | Pincus et al. | 425/89 |
| 3,662,438 A | * | 5/1972 | Koyama | 425/186 |
| 4,822,660 A | * | 4/1989 | Lipp | 428/113 |
| 6,151,743 A | * | 11/2000 | Church et al. | 14/73 |
| 6,902,800 B2 | * | 6/2005 | Woolstencroft | 428/317.9 |
| 6,921,503 B1 | | 7/2005 | Sherwood | |

* cited by examiner

*Primary Examiner* — Christina Johnson
*Assistant Examiner* — Michael T Piery
(74) *Attorney, Agent, or Firm* — Leon D. Rosen

(57) ABSTRACT

An article (10) such as a grid fin that controls the direction of flight of a vehicle, has precisely formed passages (14) with porous locating walls (52A, 52B) and a layer of fibrous material (86) such as graphite cloth lying against one or both opposite sides of the locating wall, and with the locating wall and fibrous material impregnated with resin (84). Locating blocks (30) of foam are molded and the fibrous material (42) is wrapped around each block. The wrapped blocks (44) are each inserted into a passage (54) of a locating grid (50), so the fibrous material is compressed. The locating grid lies in a grid-holding mold (60). With the fiber-wrapped blocks inserted, the grid-holding mold is closed and resin is injected into the mold and allowed to harden. The foam blocks are removed by eroding them, as by sand blasting them, to leave a final article.

3 Claims, 3 Drawing Sheets

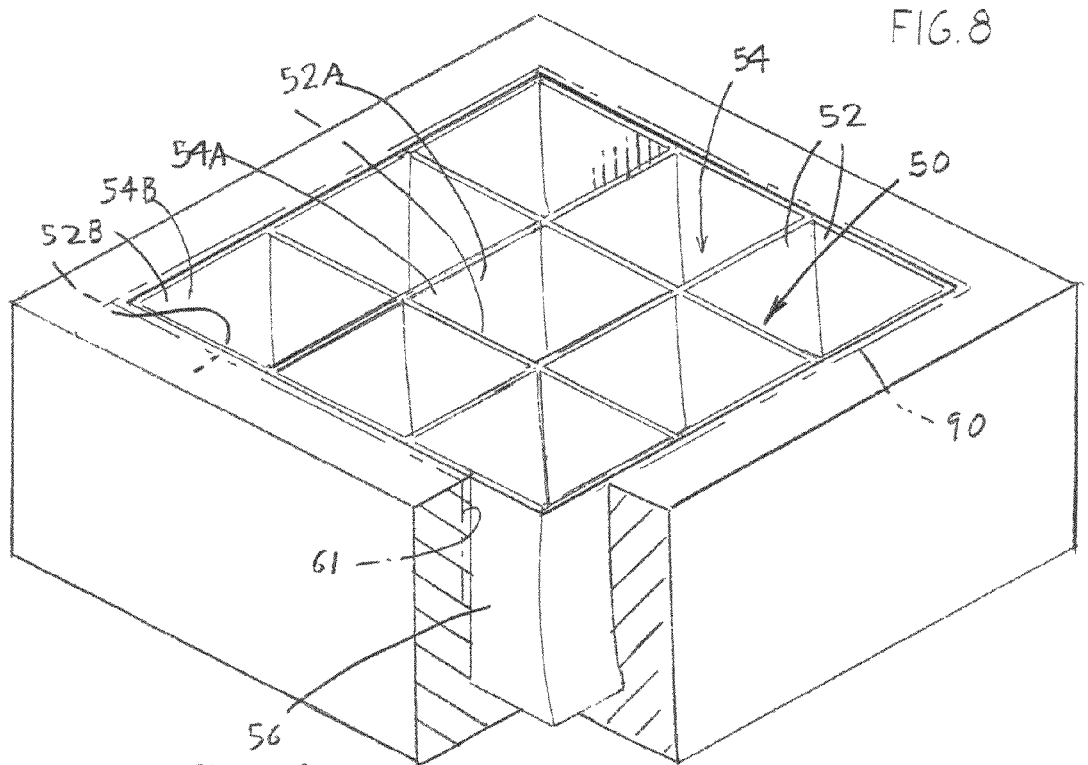
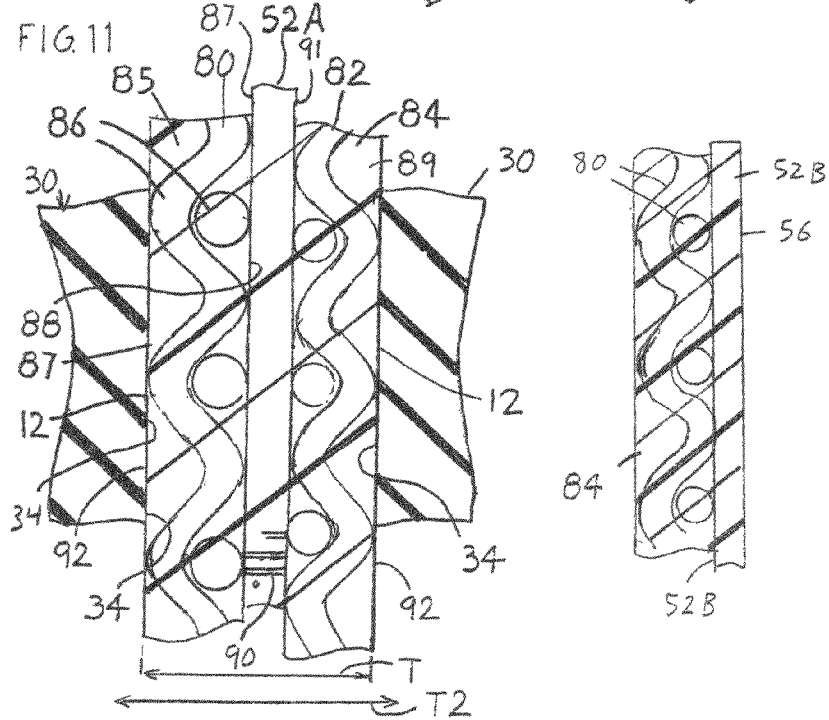

MOLDING ARTICLE WITH REINFORCED PASSAGES

CROSS-REFERENCE

This is a continuation-in-part of U.S. patent application Ser. No. 11/497,200 filed Aug. 1, 2006. Applicant claims priority from U.S. Provisional Patent application Ser. No. 61/114,448 filed Nov. 13, 2008.

BACKGROUND OF THE INVENTION

A grid fin is commonly used on aircraft, missiles and bombs as a flight control surface in place of planar fins. The grid fin has walls forming one or a plurality of passages that are exposed to rapidly flowing air. The walls of the grid fin passages are made to have a precise shape, a light weight, and a high strength and stiffness. A method for constructing at low cost, such an article with one or a plurality of passages, especially for grid fins, and the article itself, would be of value.

SUMMARY OF THE INVENTION

In accordance with one embodiment of the present invention, a method is provided for constructing, at low cost, a lightweight article with precise, high strength and stiffness, passage walls, as well as the article itself. The method is especially useful for constructing a grid fin. The article itself includes a location grid having porous mold walls that become part of the final article walls. A plurality of layers of fibrous material each lies beside one of the porous mold walls or beside both opposite sides of a porous mold wall. A quantity of hardened resin encapsulates the fibers of the fibrous material and penetrates pores of the porous mold walls to hold them tightly together to produce walls of high strength and stiffness.

The article can be manufactured by molding blocks of foam material, wrapping each block in fibrous material, and inserting each wrapped block into a different passage of a locating grid where each locating passage has porous mold walls. The fibrous material is compressed as it is inserted into one of the locating passages. A cavity that contains the locating grid is closed and a resin is injected into the cavity. The resin encapsulates fibers of the fibrous material and penetrates pores of the porous mold walls. The inner surfaces of the resin which face each locating passage, have the shape of the foam block that lies in the passage. The foam block is removed by eroding it, as by sand blasting it.

The novel features of the invention are set forth with particularity in the appended claims. The invention will be best understood from the following description when read in conjunction with the accompanying drawings.

BRIEF DESCRIPTION OF THE DRAWINGS

FIG. 8 is an isometric view of the locating grid that is placed in the mold of FIG. 5.

FIG. 11 is a partial sectional view of one of the walls of the molded but not finished grid fin of FIG. 7.

FIG. 12 is a partial sectional view of another one of the walls of the molded but not finished grid fin of FIG. 7.

DESCRIPTION OF THE PREFERRED EMBODIMENTS

Figure 10:
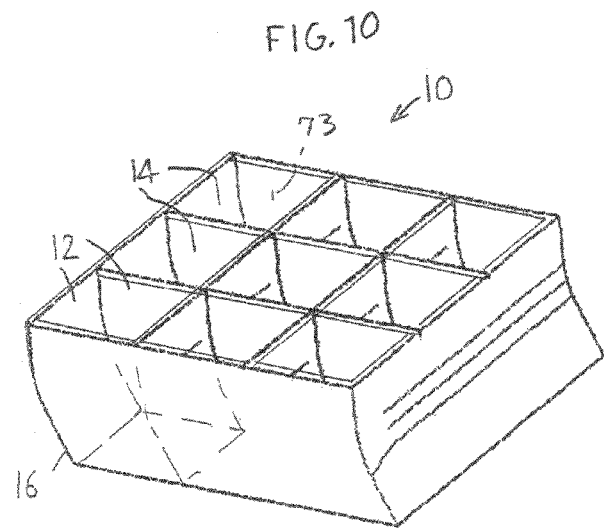
FIG. 10 is an isometric view of the final grid fin.

FIG. 10 illustrates a finished grid fin 10 which is designed for use on a thrust reversal assembly of an aircraft. The grid fin includes passage walls 12 that form a plurality of through passages 14 that have curved lower, or downstream portions 16. Each of the passages has a precise shape and has stiff but lightweight passage walls, which are achieved by constructing the passage walls largely of fibrous material such as graphite cloth, impregnated with resin.

Figure 1:
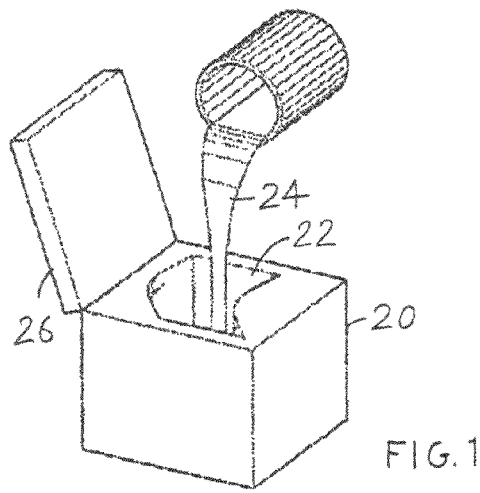
FIG. 1 is an isometric view showing one step in the manufacture of a grid fin, involving molding locating blocks.
Figure 2:
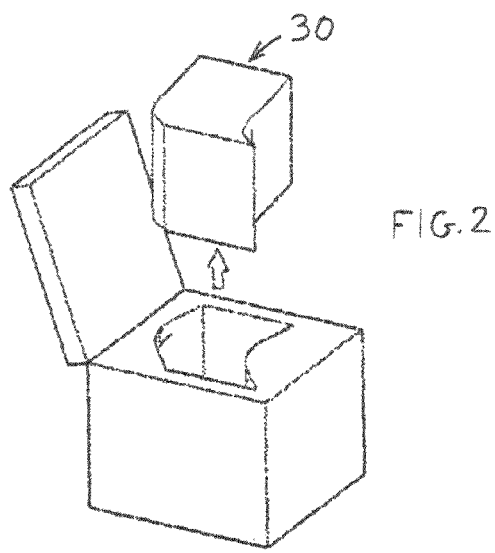
FIG. 2 is an exploded isometric view of another step, involving removal of a locating block from a mold.
Figure 3:
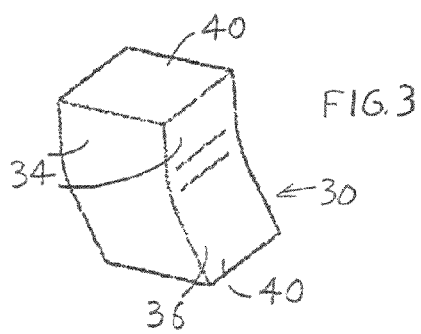
FIG. 3 is an isometric view of the locating block of FIG. 2 after it has been turned.

FIG. 1 illustrates a first step in the construction of the grid fin, which is the molding of locating blocks. This is accomplished by pouring a foamable material 24 into a cavity 22 of a block mold 20, and closing the mold as by cover 26. The cover 26 preferably is locked onto the rest of the mold and sufficient foamable material is placed into the mold, so the foam completely fills the mold and the foam is compressed in the mold to produce a block having smooth surfaces. When the foamable material solidifies, a locating block 30 shown in FIG. 2 is removed from the mold. FIG. 3 shows the locating block after it has been turned 90° so a curved bottom portion 36 lies at the lower portion of the block. The block has partially vertical sides 34 and has top and bottom ends 40.

Figure 4:
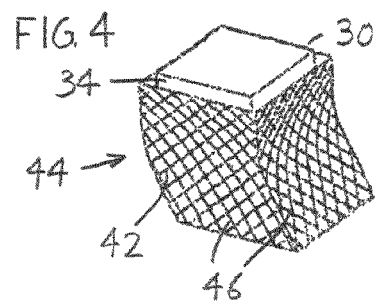
FIG. 4 is an isometric view of the locating block of FIG. 3 after a fibrous material has been placed about it.

FIG. 4 shows the locating block after a fibrous layer 42 has been applied to it. The fibrous layer can include one or a plurality of sheets of fibers. The sheets each includes fibers extending across each other (extending at angles to each other). This can be accomplished by wrapping a layer of woven or matt fibers around the block to lie at all four sides 34 of the block. This also can be accomplished by adhering each of four separate layers of fibers against a different one of the block sides. The result is a wrapped block 44 consisting of a foam locating block 30 and a layer 46 of fibrous material lying adjacent to each of the sides 34 of the block.

Figure 5:
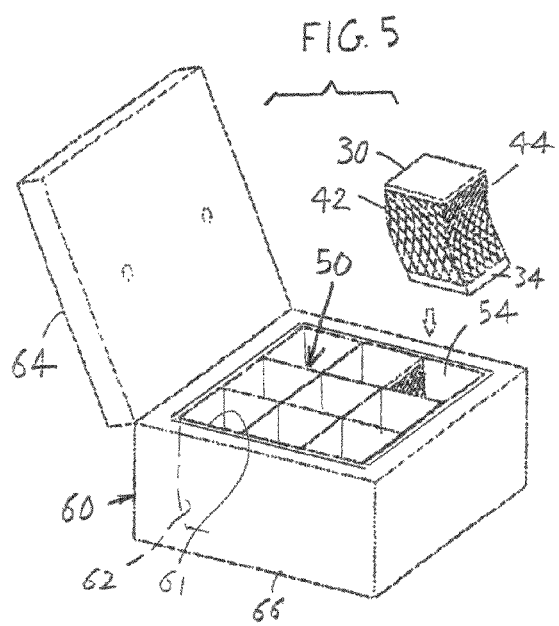
FIG. 5 is an exploded isometric view of another step, showing the block with fibrous material thereon being placed in a multi passage locating grid which lies in a locating mold.

FIG. 5 shows a next step which is the construction of a locating mold 50, or grid, which is placed in a mold 60. FIG. 8 shows that the locating grid 50 includes locating side walls 52 defining primarily parallel passages 54, including a passage 54A which has all side walls 52A lying adjacent to other passages. The grid also includes passages such as 54B which has one or two side walls 52B that lie adjacent to the outside 56 of the locating grid. The walls 52 of the locating grid are porous to the flow of a polymer such as a resin. As shown in FIG. 5, the locating grid 50 is placed in a bottom portion 62 of an outer mold 60. Then, each of the wrapped blocks 44 is inserted into one of the locating grid passages 54.

Since the locating grid passages 54 have non-circular curved portions and each block 30 has a curved lower portion, the blocks could not be inserted down into the passages 54, unless there was clearance between each block and passage. The space occupied by the fibrous layer 42 provides such clearance even though each wrapped block fits tightly in a passage so the fibrous layer is compressed.

Figure 6:
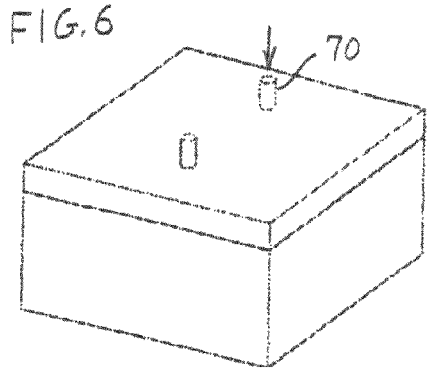
FIG. 6 is an isometric view of the mold of FIG. 5 closed by a cover, and with resin being injected into the locating mold.

After the wrapped locating blocks have been inserted into the passages of the locating grid, a top part 64 of the outer mold is closed and latched in place over a bottom part 66 of the outer mold. Then, a resin such as epoxy is injected under pressure into the closed mold though a mold inlet 70 (FIG. 6). The injected resin fills the space between fibers of the fibrous layers and fills the pores of the porous walls of the locating grid, and forms passage surfaces where the sides surfaces 34 of the locating blocks lie.

Figure 7:
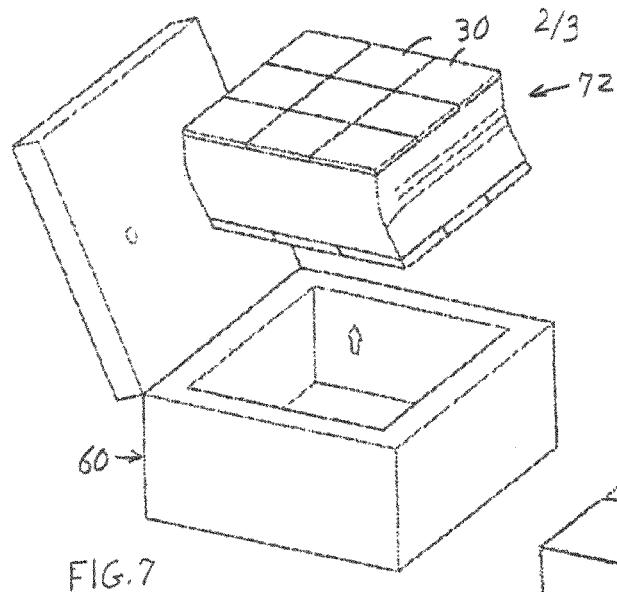
FIG. 7 is an exploded isometric view of another step, showing the molded grid fin being removed from the locating mold.
Figure 9:
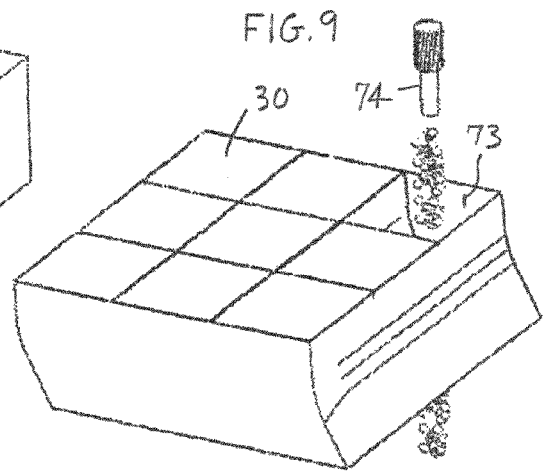
FIG. 9 is an isometric view of the molded grid fin, showing eroding of the locating blocks by sand blasting.

FIG. 7 shows the molded grid fin 72 as it appears when removed from the mold 60. All passages are filled by the foam blocks 30. Foam is easier to erode than resin. FIG. 9 shows a next step which is the removal of the foam blocks by mechanical means as by mechanically eroding them, that is, by breaking each block into smaller pieces and removing the pieces from the passages. FIG. 9 shows such erosion being accomplished by sand blasting the passages using a sand blast head 74 to remove the foam blocks. Another way is to mount a wire brush on an electric drill or the like and insert the brush into the passages. Such mechanical means of removing the block leaves very small marks 73 on the inside surfaces of the passages, which shows that there has been mechanical eroding. FIG. 10 shows the final article 10 which is a grid fin.

FIG. 11 is a sectional view of the molded but not finished grid fin of FIG. 7. Layers or quantities 80, 82 of fibrous material such as graphite cloth or fiberglass, lie on opposite sides of a shared porous locating passage wall 52A that forms a wall of a passage. One or more sheets or other quantities of fibrous material 86 or multiple matt sheets of fibrous material form each fibrous layer. The fibrous material 86 has inner and outer sides or surfaces 87, 88 that respectively face surfaces 87 of the porous locating wall 52A and face the locating block wall or side 34 of a locating block 30. Resin 84 fills the spaces 85 between fibers 86 of the fibrous material and encapsulates a majority of the fibrous material. The resin 84 also fills the pores 90 of the porous walls 52A and spaces 89 between fibrous material 82 lying on the outside of the porous wall 52A. Similarly fibrous material 82 lying beside an outer surface 91 of the wall 52A fills spaces of the layer 82. Thus, the resin connects each of the fibrous layers 80, 82 lying on opposite sides of the porous walls through the porous locating walls 52A. This results in a passage wall of the final grid having the stiffness of a wall of the thickness T of the two fibrous layers plus the thickness of the porous passage wall, that was formed of material of about the rigidity of resin and of the fibrous material. The surfaces 92 of the final passage walls 12 are defined by the surfaces of the sides 34 of the locating blocks 30. The thickness of the two layer of fibrous material 80, 82 and the porous mold passage wall 52A prior to compression of the fibers by the blocks 30, is T2 which is greater than the final thickness T. When the locating blocks are inserted into the grid fin passages, the fibrous material is compressed into the total wall thickness T. This results in the fibrous material tending to extend though the entire thickness of each layer that lies beside the mold wall 52A. As a result, fibrous material lies at the passage surfaces 92 to strengthen all of the resin for high strength and stiffness of the grid passage walls.

FIG. 12 shows the construction of the outside walls such as 52B (FIG. 8) of the grid fin. The outside wall has only one fibrous layer 80 (which comprises two thicknesses of fibers) which lies against the porous wall 52B of the grid fin. It is possible to provide the same strength in the outside wall as in an inside wall by providing a mold cavity 61 (FIG. 8) of slightly increased width and length. Also, a layer of fibrous material is placed around the outside of the locating grid fin, as indicated at 90 in FIG. 8.

Thus, the invention provides an article with at least one and usually a plurality of precisely shaped passages having stiff and strong passage walls, and provides a low cost method for constructing the article. The method includes placing layers of fibrous material so the fibrous material lies between porous passage walls and nonporous barrier walls such as of a block, and injecting a resin into the space occupied by the fibrous material and the porous passage walls. This results in the resin encapsulating a majority of the lengths of the fibers and filling the pores of the passage walls, with the final passage having the surfaces defined by the barrier walls. The barrier walls can be formed by molded foam blocks which are wrapped in fibrous material and inserted into passages of a locating grid. After resin is injected and hardens, the locating grid with resin in the fibrous walls and in the pores of the passage walls is removed from a mold and the foam blocks are removed by mechanically eroding them, to provide the final grid or other article.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for constructing an article with at least a first reinforced article passage (14), comprising:
   wrapping a porous sheet of fibrous material (86) containing fibers extending across each other, and that has inner and outer sheet sides (87, 88) around a support block (30), so one side of the sheet lies against said support block, and inserting said support block with said sheet thereon into a first locating passage (54) of a mold (60) wherein said locating passage has porous locating walls, with at least parts of said sheet compressed between said support block and a wall (52A, 52B) of said locating passage;
   injecting a resin (84) to flow into pores of said sheet of fibrous material and into pores of said porous locating walls so resin extends continuously from spaces between fibers of said porous locating walls, and allowing said resin to harden;
   removing said support block to leave said reinforced article passage with resin reinforced fibrous sheet material at a wall of the article passage.

2. The method described in claim 1 wherein said article has at least a second reinforced article passage, wherein said first and second passages share a shared passage wall (52A), comprising;
   wrapping a second porous sheet (82) of fibrous material around a second support block and inserting said second support block into a second locating passage, so a side of said second porous sheet lies against a face of one of said shared passage walls (52A);
   said step of injecting includes flowing said resin into said second quantity of fibrous sheet material so resin extends continuously from pores of said first quantity (86) of fibrous sheet material through pores (90) of said shared passage wall into pores (89) of said second quantity of fibrous sheet material.

3. A method for constructing an article with a plurality of reinforced passages, comprising:

forming a plurality of blocks (30) of block material, each block being in the form of at least part of one of said passages;

wrapping a porous sheet of fibrous material (46) that comprises fibers extending across each other, around at least a portion of each of said blocks to form a plurality of wrapped blocks (44);

forming a locating mold (50) with a plurality of mold walls (52) that form passages (54) that are each of a size and shape to tightly receive one of said wrapped blocks, wherein each mold wall is porous;

inserting each wrapped block into one of said passages;

injecting a flowable and hardenable material (84) into said mold to fill said porous passage walls and any space around and between fibers of said fibrous material;

allowing said flowable material to harden, and removing said block material from said passages.

\* \* \* \* \*